(12) United States Patent
Yang et al.

(10) Patent No.: US 10,492,139 B2
(45) Date of Patent: Nov. 26, 2019

(54) SYSTEM AND METHOD FOR SECURE AND QUICK WAKE UP OF A STATION

(71) Applicant: Futurewei Technologies, Inc., Plano, TX (US)

(72) Inventors: Yunsong Yang, San Diego, CA (US); Gaokun Pang, Shenzhen (CN); Shimon Shilo, Herzliya (IL); Avi Weitzman, Rechovot (IL); Genadiy Tsodik, Netanya (IL)

(73) Assignee: Futurewei Technologies, Inc., Plano, TX (US)

( * ) Notice: Subject to any disclaimer, the term of this patent is extended or adjusted under 35 U.S.C. 154(b) by 18 days.

(21) Appl. No.: 15/336,033

(22) Filed: Oct. 27, 2016

(65) Prior Publication Data

US 2018/0063788 A1 Mar. 1, 2018

Related U.S. Application Data

(60) Provisional application No. 62/381,899, filed on Aug. 31, 2016.

(51) Int. Cl.
*H04W 52/02* (2009.01)
*H04W 12/10* (2009.01)
(Continued)

(52) U.S. Cl.
CPC . *H04W 52/0229* (2013.01); *H04W 12/00502* (2019.01); *H04W 12/10* (2013.01);
(Continued)

(58) Field of Classification Search
None
See application file for complete search history.

(56) References Cited

U.S. PATENT DOCUMENTS 9,204,394 B2 12/2015 Jia et al.
2009/0307766 A1* 12/2009 Rose ............... H04L 1/02
726/13
(Continued)

FOREIGN PATENT DOCUMENTS

CN 104301973 A 1/2015
WO 2014176979 A1 11/2014

OTHER PUBLICATIONS

Park, et al., "Low-Power Wake-Up Receiver (LP-WUR) for 802.11," IEEE 802.11-15/1307r1, Nov. 10, 2015, 18 pages.
(Continued)

*Primary Examiner* — Yaotang Wang
(74) *Attorney, Agent, or Firm* — Slater Matsil, LLP

(57) ABSTRACT

A method for waking up a radio communications module (RCM) of a station with a wake-up receiver includes receiving a wake-up signal with the wake-up receiver, waking up the RCM from a sleeping mode, transmitting a second frame if a first frame is received within a specified time after waking up the RCM and if an integrity of the first frame is verified successfully, and placing the RCM into the sleeping mode and the wake-up receiver into an active mode if the first frame is not received within the specified time after waking up the RCM or if the first frame is received within the specified time after waking up the RCM but the integrity of the first frame is not verified successfully.

38 Claims, 8 Drawing Sheets

(51) Int. Cl.
*H04L 9/00* (2006.01)
*H04W 12/00* (2009.01)
*H04W 88/08* (2009.01)
*H04L 9/32* (2006.01)
*H04W 84/12* (2009.01)
*H04W 76/27* (2018.01)
*H04L 9/06* (2006.01)

(52) U.S. Cl.
CPC ... *H04W 12/1008* (2019.01); *H04W 52/0209* (2013.01); *H04W 52/0241* (2013.01); *H04L 9/0637* (2013.01); *H04L 9/3242* (2013.01); *H04W 76/27* (2018.02); *H04W 84/12* (2013.01); *H04W 88/08* (2013.01); *Y02D 70/00* (2018.01); *Y02D 70/10* (2018.01); *Y02D 70/1262* (2018.01); *Y02D 70/14* (2018.01); *Y02D 70/142* (2018.01); *Y02D 70/144* (2018.01); *Y02D 70/162* (2018.01); *Y02D 70/166* (2018.01); *Y02D 70/20* (2018.01); *Y02D 70/26* (2018.01)

(56) References Cited

U.S. PATENT DOCUMENTS

| | | | | |
|---|---|---|---|---|
| 2011/0291803 | A1* | 12/2011 | Bajic | G08B 13/2462 340/10.1 |
| 2012/0110331 | A1 | 5/2012 | Falk et al. | |
| 2013/0076531 | A1* | 3/2013 | San Vicente | A61B 5/0015 340/870.02 |
| 2014/0295772 | A1* | 10/2014 | Van Greunen | H04W 12/12 455/68 |
| 2017/0017822 | A1* | 1/2017 | Zimmerman | G06K 7/1486 |
| 2017/0111858 | A1* | 4/2017 | Azizi | H04W 52/0212 |
| 2017/0134943 | A1* | 5/2017 | Min | H04W 12/06 |
| 2018/0041959 | A1 | 2/2018 | Yang et al. | |

OTHER PUBLICATIONS

Park, et al., "LP-WUR (Low-Power Wake-Up Receiver): Enabling Low-Power and Low-Latency Capability for 802.11," IEEE 802.11-16/0027r0, Jan. 18, 2016, 21 pages.

Park, et al., "LP-WUR (Low-Power Wake Up Receiver) Follow-Up", IEEE 802.11-16/0341r0, Mar. 14, 2016, 9 pages.

Falk, Reiner, et al.,"Fighting Insomnia: A Secure Wake-up Scheme for Wireless Sensor Networks," 2009 Third International Conference on Emerging Security Information, Systems and Technologies, Jun. 18-23, 2009, pp. 191-196.

Yang, Z., et al., "Link-Layer Protection in 802.11i WLANs with Dummy Authentication", Mar. 16-18, 2009, 8 pages, Zurich, Switzerland.

* cited by examiner

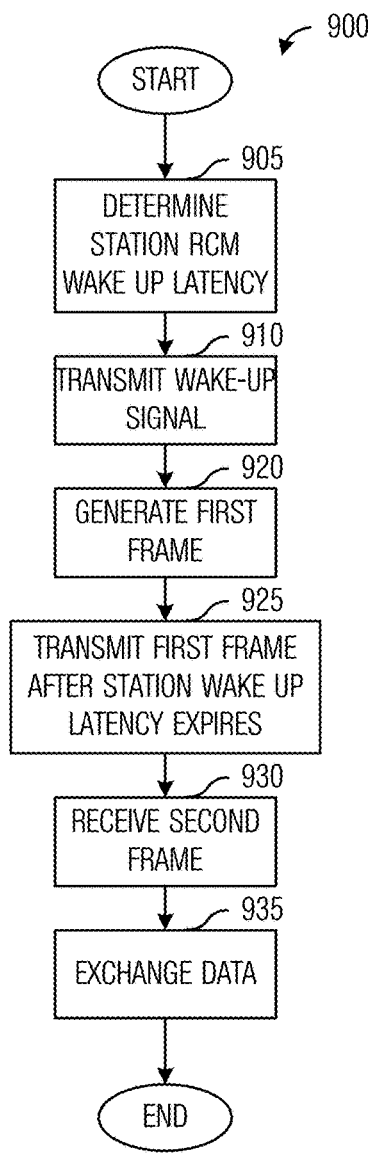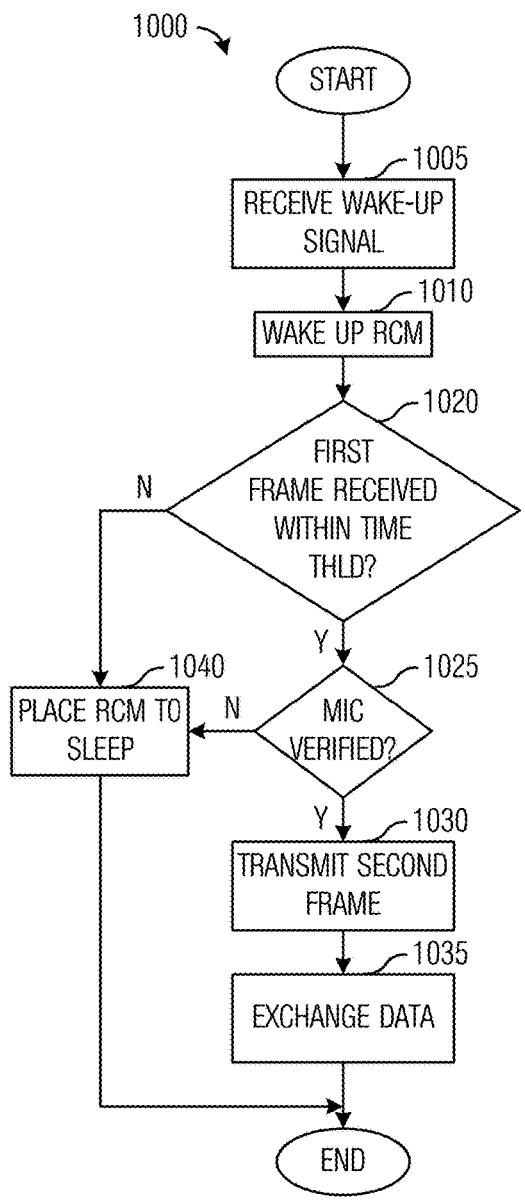
Fig. 9
Fig. 10

SYSTEM AND METHOD FOR SECURE AND QUICK WAKE UP OF A STATION

This application claims the benefit of U.S. Provisional Application No. 62/381,899, filed on Aug. 31, 2016, entitled "System and Method for Secure and Quick Wake Up of a Station," which application is hereby incorporated herein by reference.

TECHNICAL FIELD

The present invention relates generally to a system and method for digital communications, and, in particular embodiments, to a system and method for secure and quick wake up of a station.

BACKGROUND

Power consumption is a key consideration in devices that are battery powered. A design criterion for a battery powered device is to minimize power consumption to extend the period of time between battery recharges or replacement as much as possible. In some deployments, such as remotely located sensors, battery replacement may be both impractical as well as expensive. Even in situations where the battery powered device is readily accessible and recharging is easy, such as in cellular telephones, tablets, laptop computers, wearable devices (WDs), and so on, recharging the battery is still an inconvenient and time consuming task.

Radio communications modules (RCMs), which provide wireless connectivity that is so vital to the operation of these battery powered devices, are also significant sources of power consumption. Therefore, there is a need to reduce power consumption in battery powered devices with RCMs.

Security is another key consideration in devices. A malicious device may be able to cause a device to spend a considerable amount of power, thereby depleting its battery, by having the device respond to transmissions directed towards the device. The malicious device may be able to do so even without being able to penetrate the security of the device. Therefore, there is a need to provide protection against malicious devices intending to deplete the battery of battery powered devices.

SUMMARY

Example embodiments provide a system and method for secure and quick wake up of a station.

In accordance with an example embodiment, a method for waking up a radio communications module (RCM) of a station with a wake-up receiver is provided. The method includes receiving, by the station, a wake-up signal with the wake-up receiver, the wake-up signal including an identifier of the station, waking up, by the station, the RCM from a sleeping mode, transmitting, by the station, a second frame if a first frame is received within a specified time after waking up the RCM and if an integrity of the first frame is verified successfully, and placing, by the station, the RCM into the sleeping mode and the wake-up receiver into an active mode if the first frame is not received within the specified time after waking up the RCM or if the first frame is received within the specified time after waking up the RCM but the integrity of the first frame is not verified successfully.

In accordance with an example embodiment, a method for operating a first station configured to wake up a RCM of a second station is provided. The method includes transmitting, by the first station, a wake-up signal to the second station, generating, by the first station, a first frame including a message integrity code (MIC) generated by a cryptographic hash function with values in the first frame and a first cryptographic key, transmitting, by the first station, the first frame to the second station after a latency period expires, where the latency period is based on a time needed for waking up the RCM of the second station, and receiving, by the first station, a second frame from the second station.

In accordance with an example embodiment, a station is provided. The station includes a processor, and a computer readable storage medium storing programming for execution by the processor. The programming including instructions to configure the station to receive a wake-up signal with a wake-up receiver, the wake-up signal including an identifier of the station, wake up a RCM from a sleeping mode, transmit a second frame if a first frame is received within a specified time after waking up the RCM and if an integrity of the first frame is verified successfully, and place the RCM into the sleeping mode and the wake-up receiver into an active mode if the first frame is not received within the specified time after waking up the RCM or if the first frame is received within the specified time after waking up the RCM but the integrity of the first frame is not verified successfully.

In accordance with an example embodiment, a first station is provided. The first station includes a processor, and a computer readable storage medium storing programming for execution by the processor. The programming including instructions to configure the first station to transmit a wake-up signal to a second station, generate a first frame including a MIC generated by a cryptographic hash function with values in the first frame and a cryptographic key, transmit the first frame to the second station after a latency period expires, where the latency period is based on a time needed for waking up a RCM of the second station, and receive a second frame from the second station.

Practice of the foregoing embodiments enables a first device to verify the authenticity of a first frame received from a second device and thereby the authenticity of a wake-up signal received from the second device prior to receiving the first frame, before the first device makes a single transmission towards the second device. Therefore, the first device does not reveal itself unless the authenticity of the wake-up signal is verified.

Practice of the foregoing embodiments also enables the first device to set its network allocation vector (NAV), thereby allowing the first device to avoid having to wait an extended amount of time prior to transmitting.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 9 illustrates a flow diagram of example operations occurring in an AP waking up and communicating with a station that has placed its RCM into a sleep or reduced power state according to example embodiments described herein;

FIG. 10 illustrates a flow diagram of example operations occurring in a station that is woken up and communicates with an AP according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

Figure 1:
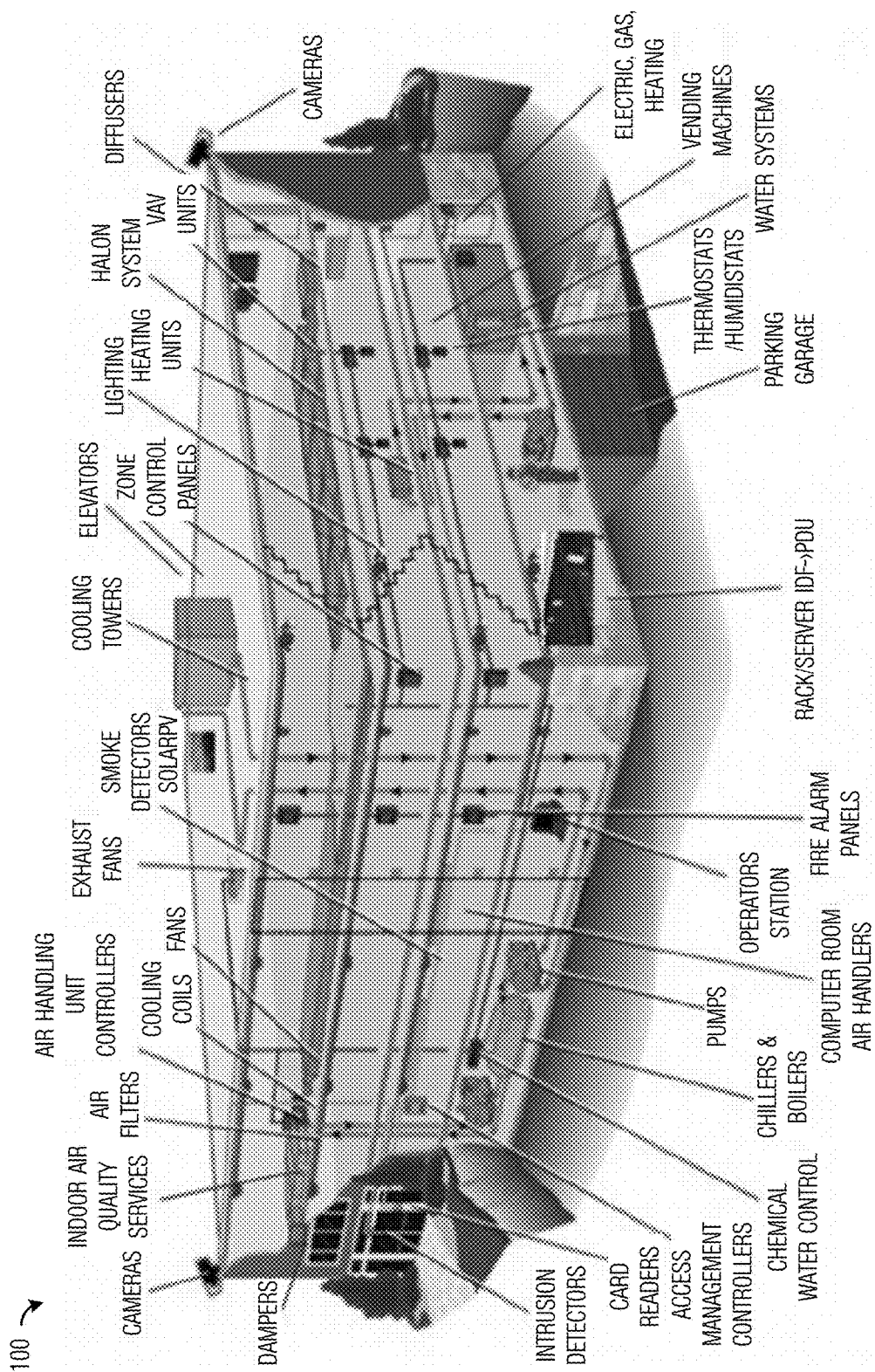
FIG. 1 illustrates an example smart building.

The Internet of Things (IoT) is a suite of technologies and applications that enable devices and locations to generate all kinds of information—and to connect those devices and locations for instant data analysis and, ideally, "smart" actions. For example, the IoT promises to facilitate smart buildings by uniting a variety of sensors and facility equipments into an integrated whole. FIG. 1 illustrates an example smart building 100 highlighting various sensors and monitoring devices, which are deployed in or around a commercial or residential building to monitor various conditions such as lighting, temperature, air quality, fire, smoke, carbon monoxide (CO) gas, security, intrusion, etc., and various facility equipments such as lighting equipments, heating or cooling equipments, air ventilation equipments, fire alarms, sprinkling system, security alarms, information systems, etc., which are deployed to control the various fore-mentioned conditions in order to provide a healthy, comfort, and safe environment for people in the building and to do so in an energy-efficient manner. The various sensors and monitoring devices communicate with the various facility equipments, either directly or via a communications and control center, by using data communications technologies. For example, one or more data access points may be deployed throughout a smart building, where the data access points are connected to a center of communications, data analysis, and control, typically via wired connections such as cables. The data access points are also connected to the various sensors and monitoring devices, as well as communications modules on the various facility equipments, typically via radio communications (such as Wi-Fi, BlueTooth, and ZigBee), so that the various sensors and equipments may be deployed anywhere in the building at a later time without the need to alter the previous cable-wiring. Many of these sensors and the communications modules operate on battery power.

In addition, the IoT also promises to bring many other types of devices that operate on battery power and use radio communications, such as personal wearable devices in the consumer market, as well as sensors that are used in industrial IoT, such as in mining industry, transportation, agriculture, livestock, etc.

Figure 2:
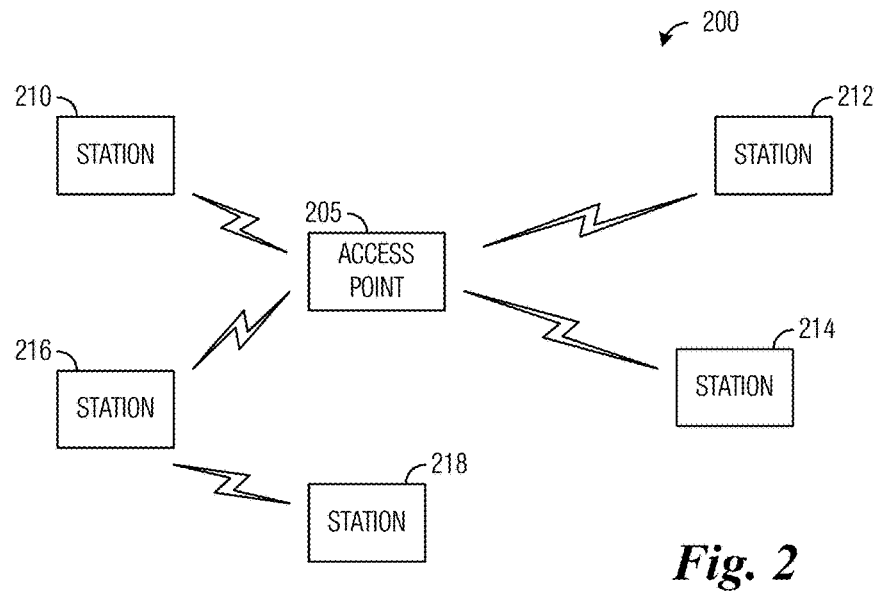
FIG. 2 illustrates an example IEEE 802.11 communications system.

FIG. 2 illustrates an example IEEE 802.11 communications system 200, which may be used for data communications in smart buildings. Communications system 200 includes an access point (AP) 205 that is serving a plurality of stations, such as stations 210, 212, 214, 216, and 218. For example, stations 210-218 may be the sensors, the monitoring devices, and the communications modules of the facility equipments in the smart building, and AP 205 may be the data access point in the smart building, as illustrated and described previously in FIG. 1. In a first operating mode, commonly referred to as infrastructure-based communications mode or Wireless LAN (WLAN) mode, access point 205 controls certain aspects (such as radio frequency channel, transmission power limit, authentication, security, etc.) of communications with or among its associated stations. Generally speaking, in communications system 200, wireless resources for both uplink (station to access point) and downlink (access point to station) transmissions are accessed by transmitters based on a distributed contention mechanism commonly referred to as carrier sensing multiple access with collision avoidance (CSMA/CA). However, access point 205 still may influence the resource allocation by assigning different access priorities to stations and/or traffic types, and when succeeding in channel contention, by explicitly allocating certain time periods for certain stations and/or traffics or for special purposes, such as Quiet Period during which time no transmitter may transmit.

In a second operating mode, commonly referred to as a direct communications mode, ad-hoc mode, or peer-to-peer mode, stations (such as station 216 and station 218) act as peer stations and may communicate directly with one another without going through a centralized entity such as access point 205. Examples of such direct communications include Wi-Fi Direct and neighbor awareness networking (NAN) compliant communications systems, both of which are specified by the Wi-Fi Alliance based on the IEEE 802.11 Standards.

While it is understood that communications systems may employ multiple access points capable of communicating with a number of stations, only one access point and five stations are illustrated for simplicity.

As discussed before, many wearable devices, sensors, and IoT devices operate on battery power. Therefore, it is desired that the radio communications modules (RCMs) on these devices have low power consumption.

Figure 3:
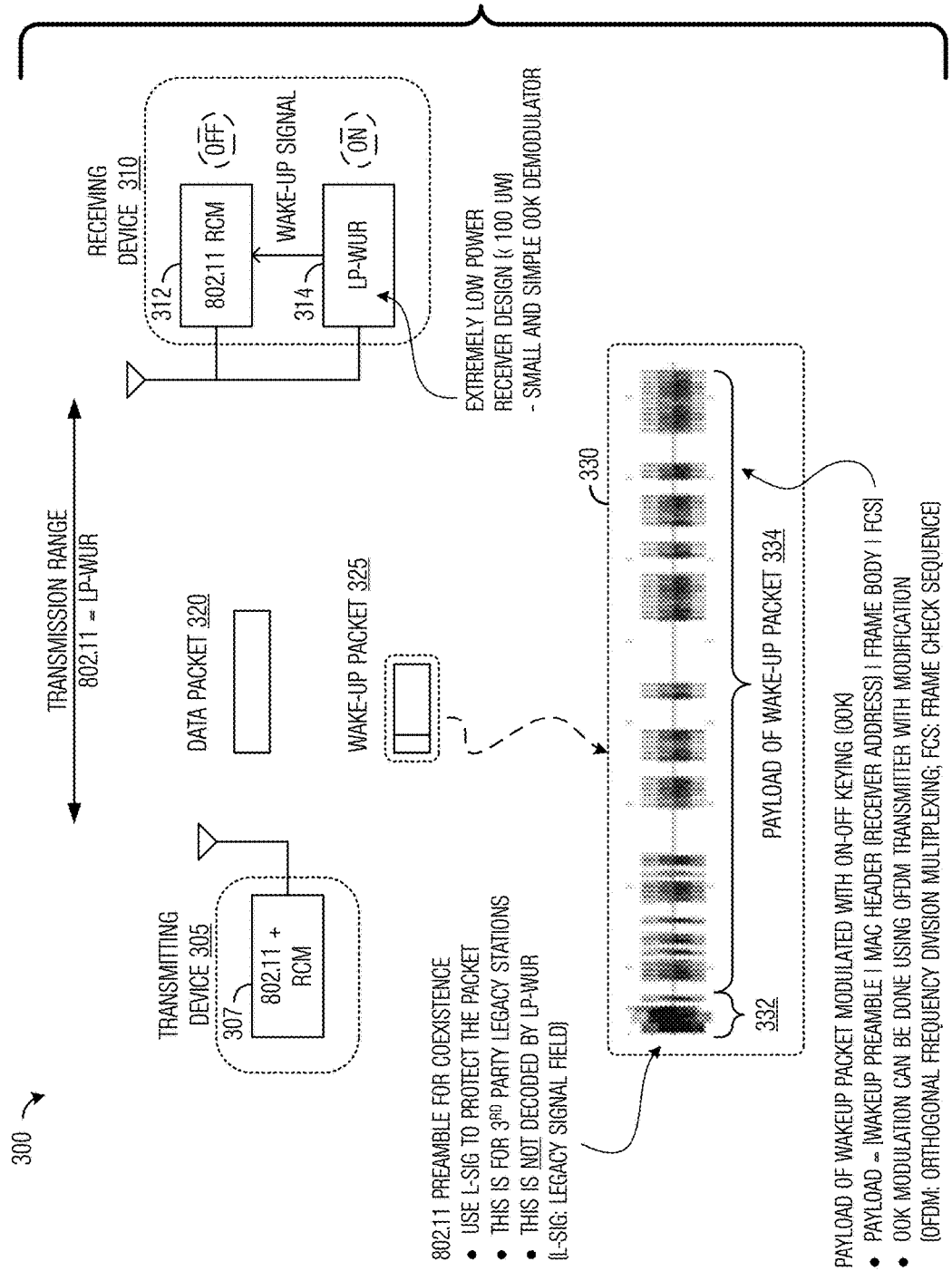
FIG. 3 illustrates an example IEEE 802.11 communications system with a low-power wake-up radio.

FIG. 3 illustrates an example IEEE 802.11 communications system 300 with a low-power wake-up radio (LP-WUR). Communications system 300 includes a transmitting device 305 and a receiving device 310. Transmitting device 305 includes, among other things, an enhanced 802.11 RCM (labeled "802.11+") 307. Enhanced 802.11 RCM 307 is capable of communications utilizing IEEE 802.11 standard signaling, as well as LP-WUR signaling, including the transmission of a wake-up packet. At least a payload portion of the wake-up packet may be transmitted over a much narrower channel bandwidth than the IEEE 802.11 standard signaling. For example, IEEE 802.11 standard signaling may be transmitted over a channel bandwidth of 20 MHz and the payload of the wake-up packet may be transmitted over a channel bandwidth of 5 MHz or less. A narrower bandwidth helps to reduce the cost and power consumption of an intended wake-up receiver, such as one in receiving device 310. A simple modulation and coding scheme (MCS), such as On-Off-Keying (OOK), is being considered for transmitting the wake-up packet in order to facilitate simple and low power receivers. However, OOK modulation tends to have a shorter reception range for a given signal-to-noise (SNR) than other MCSs. The narrower bandwidth helps to boost the transmission power spectrum density (and thus the received SNR) within the pass-band. A higher received SNR within the narrower pass-band helps to offset or partially offset the negative impact of the OOK modulation on the reception range of the wake-up packet.

Receiving device 310 includes, among other things, an 802.11 RCM 312 and a LP-WUR 314. 802.11 RCM 312 is intended for communicating user data while LP-WUR 314 is not. Thus, LP-WUR 314 usually does not have a transmitter. LP-WUR 314 is present to assist in waking up 802.11 RCM 312 from a sleeping or OFF mode. In general, LP-WUR 314 is ON when 802.11 RCM 312 is OFF (e.g., in the sleeping mode). LP-WUR 314 comprises a memory (or register) designed to store a value provided by a processor associated with 802.11 RCM 312, a receiver designed to receive at least the payload of the wake-up packet, and a comparator designed to compare a value in the received payload with the value stored in the memory. The comparator generates a signal referred to as a wake-up interrupt when the received value matches with the stored value. LP-WUR 314 is coupled to 802.11 RCM 312 through a connection used for carrying the wake-up interrupt, which may be used by LP-WUR 314 to wake up 802.11 RCM 312 from the sleeping mode. In computer science, an interrupt is a term used to refer to a signal external to a processor that alerts the processor to a high-priority condition or event requiring the interruption of the current program the processor is executing. The processor responds by suspending its current activities and executing programs to deal with the event. The interruption may be temporary, and, after the execution of programs dealing with the event finishes, the processor may resume its current activities. For example, when there is no data communications for a while or when a sleep command is received, a processor associated with 802.11 RCM 312 may execute a program that places at least a major portion of the electronic circuits inside 802.11 RCM 312 into a sleeping mode, which may also be referred to as a power save mode or a power off mode.

While the portion of the electronic circuits of 802.11 RCM 312 is in the sleeping mode, the capabilities of 802.11 RCM 312 is disabled to the extent that the 802.11 RCM 312 is no longer capable of communications utilizing IEEE 802.11 standard signaling. Later on, when receiving the wake-up interrupt generated by LP-WUR 314, the processor associated with 802.11 RCM 312 responds to the wake-up interrupt by powering up the electronic circuits inside 802.11 RCM 312 thereby, 802.11 RCM 312 resumes the ability to communicate utilizing IEEE 802.11 standard signaling. In general, when in the ON or active state, 802.11 RCM 312 will consume significantly more power than LP-WUR 314, e.g., at least one or two orders of magnitude more energy. An example target power consumption for LP-WUR 314 is less than 100 micro-watts while ON. The receiver of LP-WUR 314 has a narrow bandwidth matching the bandwidth of the payload of the wake-up packet, 5 MHz or less, for example, and has a reception range that is approximately equal to that of the 802.11 RCM 312.

When performing 802.11 communications, transmitting device 305 transmits data packets, such as data packet 320, to receiving device 310, where 802.11 RCM 312 receives and processes the data packet.

As shown in FIG. 3, receiving device 310 initially is in a reduced power state. One of the ways that receiving device 310 is able to reduce power consumption is to turn OFF 802.11 RCM 312 while keeping LP-WUR 314 ON. When receiving device 310 is in the reduced power state, 802.11 RCM 312 is OFF and receiving device 310 is unable to receive or process 802.11 data packets.

However, LP-WUR 314 remains ON and receiving device 310 is able to receive wake-up packets, such as wake-up packet 325. In a situation where transmitting device 305 has data to transmit to receiving device 310, but receiving device 310 is in the reduced power state, transmitting device 305 first transmits a wake-up packet 325 to receiving device 310, e.g., using 802.11+ RCM 307. Wake-up packet 325 is received and processed by LP-WUR 314, which wakes up 802.11 RCM 312. Then, transmitting device 305 transmits data to receiving device 310 using 802.11+ RCM 307 and receiving device 310 receives the data using 802.11 RCM 312.

Highlight 330 provides a detailed view of an example wake-up packet, e.g., wake-up packet 325. The wake-up packet includes a preamble 332 and a payload 334. In order to maintain compatibility with 802.11 compliant devices in communications system 300, preamble 332 is an 802.11 legacy preamble transmitted over a channel bandwidth complaint with 802.11 standard signaling, such as 20 MHz. Preamble 332 is not to be detected by the LP-WUR, such as LP-WUR 314, because the receiver bandwidth of LP-WUR is usually insufficient to receive 802.11 legacy preambles, such as preamble 332. Instead, preamble 332 is intended for legacy 802.11 devices to prevent them from transmitting during the transmission of payload 334. A RATE subfield and a LENGTH subfield of a Legacy SIGNAL field (L-SIG) in preamble 332 are used to indicate the duration of payload 334. Payload 334 includes information that is modulated using a simple modulation scheme, such as OOK, and is transmitting over a narrower channel bandwidth, such as 5 MHz or less. Therefore, legacy 802.11 devices normally won't be able to decode payload 334 correctly. However, legacy 802.11 devices are capable of detecting preamble 332 because preamble 332 fully complies with the bandwidth and signal format of legacy 802.11 standards. Thus, after receiving and processing preamble 332, legacy 802.11 devices recognize that the channel will be busy for at least a duration that is computed with the values in the RATE and LENGTH subfields and thereafter suspend their attempts of transmitting during the transmission of payload 334, as if payload 334 complied with IEEE 802.11 standard signaling. It is noted that OOK modulation may be implemented using an OFDM transmitter with relatively minor modification, for example, enhanced 802.11 RCM 307 is not only capable of OFDM modulated communications but also capable of transmitting signals that comply with the OOK modulated waveform.

Figure 4A:
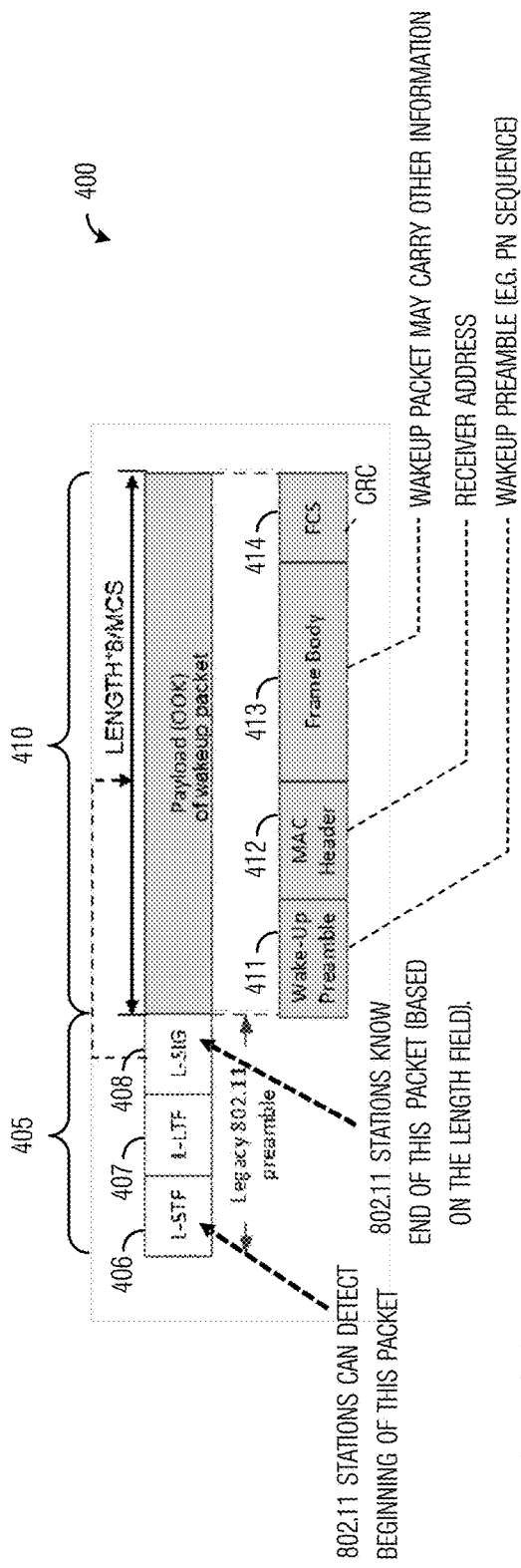
FIG. 4A illustrates a detailed view of an example wake-up packet.

FIG. 4A illustrates a detailed view of an example wake-up packet 400. Wake-up packet 400 includes a preamble 405 and a payload 410. Preamble 405 is compliant to 802.11 technical standards (including the transmission bandwidth)

and includes a Legacy short training field (L-STF) 406, a Legacy long training field (L-LTF) 407, and L-SIG 408. Payload 410 is transmitted over a narrower bandwidth than that of preamble 405. Payload 410 includes multiple fields, including a wake-up preamble 411 and a medium access control header (e.g., a receiver address) 412. Wake-up preamble 411 contains a wake-up sequence. The wake-up sequence may be a pseudo-random number sequence, for example, possessing good auto-correlation properties in order to assist LP-WURs to acquire timing for sampling and detecting the remainder of payload 410. Medium access control header 412 contains an identifier (such as the wake-up address) of a receiving device that wake-up packet 400 is intended to wake up. Payload 410 may also include a frame body 413 and a frame check sequence (FCS) 414. Frame body 413 may contain other information, such as a reason to wake up or a control parameter. FCS 414 includes a cyclic-redundancy check (CRC) for integrity checking wake-up packet 400. It is noted that the integrity checking provided by CRC is only for detecting transmission errors, not for verifying an authenticity of the message.

Figure 4B:
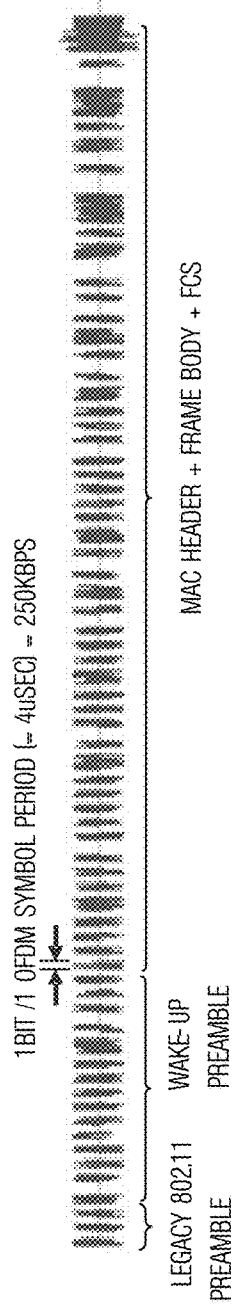
FIG. 4B illustrates an example wake-up packet in signal form.

FIG. 4B illustrates an example wake-up packet 450 in signal form. As shown in FIG. 4B, each bit in a payload (similar to payload 410) of wake-up packet 450 is transmitted over a period equal to an OFDM symbol period, which is 4 microseconds, for a total data rate of 250 kbps.

According to IEEE 802.11 REVmc, which is hereby incorporated herein by reference, a station that enters a sleep mode and then returns to an active mode later shall perform a clear channel assessment (CCA) until a valid frame is detected, by which the station can set its network allocation vector (NAV), or until a period of time equal to a Probe-Delay (generally on the order of 5 to 10 milliseconds) has expired, whichever comes first, before the station are allowed to initiate a transmission. The requirements set upon the station is to ensure that the station does not mistake a busy channel as an idle channel after the station wakes up in the midst of a transmission from a far-side station to a near-side station and starts to transmit due to the mistake, causing interference to the near-side station. Without such requirements, the station could mistake a busy channel as an idle channel due to the following two reasons: first, waking up in the middle of the on-going transmission causes the station to miss a chance to decode a duration field in the MAC header of the transmission (thus missing the chance to set its NAV), therefore unable to detect the busy channel using the virtual carrier sense (CS) function; second, the transmission is transmitted from the far-side station, thus when it reaches the station, the transmission may be weaken to a point where it becomes undetectable by the station by using the physical CS function, i.e., by energy detection.

In IEEE 802.11 compliant communications systems, a station generally performs CCA to determine that the channel is idle before initiating a transmission. The CCA is based on both physical CS and virtual CS. The physical CS is based on energy detection and comparison with a threshold. The virtual CS is provided by the medium access control layer of IEEE 802.11 using the NAV. The NAV is an indicator, maintained by each station and AP, of time periods when transmission onto the channel is not initiated by the station or AP. Any station or AP receiving a valid frame where the value in the Address 1 field (which is also known as the receiver address (RA) field) in the medium access control header of the frame is not the medium access control address of the station or AP should update its NAV to the value received in the Duration field in the medium access control header of the frame. The NAV may be considered to be a counter, which counts down to 0 at a uniform rate. When the counter is 0, the virtual CS function indicates that the channel is idle; when the counter is nonzero, the channel is busy and cannot (or should not) be accessed. A channel is considered idle only when both physical CS and virtual CS indicate that the channel is idle.

Therefore, after a wake-up receiver of a station (such as receiving station 310) wakes up a RCM (such as RCM 312) of the station (as a result of receiving the wake-up signal from a transmitting station), not only the station needs to wait for the electronic circuitry (e.g., the oscillator, analog circuits, and digital circuits) of the RCM to power up and settle, but the station also needs to wait until it receives a valid frame or until the ProbeDelay expires, whichever comes first. Then, the station has to wait for a period of time (a distributed coordinated function (DCF) interframe space (DIFS) plus a random backoff time) after receiving the valid frame or the end of the ProbeDelay, before the RCM of the station is able to transmit a frame for the first time after being woken up, e.g., to indicate to the transmitting station that the station has woken up. In a lightly loaded network, it is very likely that the station will not receive any frames and has to spend the entire ProbeDelay period listening to an idle channel, and unnecessarily consuming power while listening to an idle channel. From latency and power consumption points of view, it is desirable to enable the station to transmit as soon as possible, after being woken up by its wake-up receiver.

Figure 5:
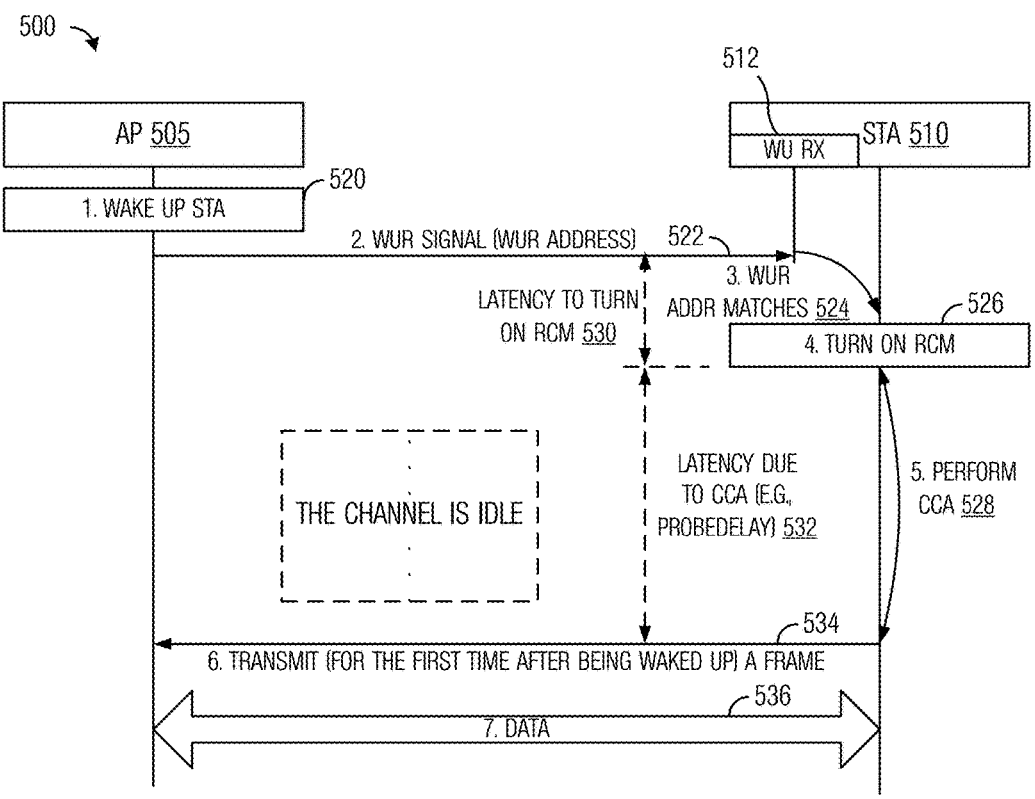
FIG. 5 illustrates a diagram of operations performed and messages exchanged by IEEE 802.11 devices participating in communications with one of the devices in a sleep or reduced power state.

FIG. 5 illustrates a diagram 500 of operations performed and messages exchanged by IEEE 802.11 devices participating in communications with one of the devices in a sleep or reduced power state, where additional latency and power consumption is incurred by the one of the devices that was in the reduced power state, due to the requirement of performing CCA after being woken up. Diagram 500 illustrates operations performed and messages exchanged by an AP 505 and a station 510, where station 510 (more specifically, a RCM of station 510 that is used for exchanging data with AP 505) is initially in the sleep or reduced power state. Station 510 includes a wake-up receiver (WU RX) 512. Wake-up receiver 512 is on (i.e., active) when station 510 is in reduced power state.

AP 505 determines to wake up station 510 (block 520). AP 505 generates a wake-up signal including a wake-up address of station 510. The wake-up address may be included in a plaintext form, a ciphered form, or a code-spread form. AP 505 transmits the wake-up signal (event 522). The wake-up signal is received by wake-up receiver 512 of station 510. Wake-up receiver 512 may process (such as parse, decipher, and/or de-spread) the wake-up signal in order to obtain the wake-up address included in the wake-up signal. Wake-up receiver 512 determines that the wake-up address in the wake-up signal matches the wake-up address of station 510 (event 524) and asserts a control signal to wake up a RCM of station 510. Detailed discussions of example systems and methods for waking up RCMs of a device is presented in a co-assigned U.S. provisional application entitled "System and Method for Waking Up a Radio Communications Module of a Device," Application No. 62/370,509, filed Aug. 3, 2016, which is hereby incorporated herein by reference. The RCM of station 510 is turned on or powered up (block 526). If the RCM powered up is an IEEE 802.11 RCM, station 510 performs CCA (event 528) using the RCM just powered up.

As discussed previously, due to IEEE 802.11 device wake-up requirements, station 510 must perform CCA until a valid frame is received or the end of the ProbeDelay.

Therefore, station 510 suffers considerable delay, which includes: a portion due to turning on the RCM (interval 530) and a portion due to performing CCA (interval 532). The duration of interval 530 is bounded by the hardware limitation for powering up the electronic circuits of the RCM and placing the RCM into a readiness state for transmitting and receiving. However, the duration of interval 532 may vary depending on the traffic condition on the channel. For example, if there are frequent transmissions of frames on the channel, it is likely that station 510 will be able to receive a frame using the RCM so as to set its NAV shortly after waking up the RCM, thereby finish performing CCA early on. On the other hand, in a lightly loaded network, the channel is likely to be idle (as illustrated in FIG. 5). In this situation, while station 510 is performing CCA (interval 532), the channel is idle and valuable network resources are wasted (because station 510 is unable to use the channel for transmission). Furthermore, because the channel is idle, station 510 also has to waste value power while trying to detect a valid frame (for setting its NAV), until the Probe-Delay period expires.

After completing CCA, station 510 is able to transmit a frame (event 534), e.g., to indicate to AP 505 that station 510 (more specifically, the RCM of station 510 that is used for exchanging data with AP 505) is woken up. It is noted that additional time occurs between the end of CCA and station 510 actually transmitting a frame, including station 510 waiting a DIFS time and a random backoff period. Station 510 and AP 505 exchange data (event 536).

Security is another source of concern. Because the wake-up receiver is intended primarily for waking up a RCM that is in a sleep mode, an attacker may repeatedly transmit a fake wake-up signal to cause the wake-up receiver to repeatedly wake up the RCM, and in the process, to drain the battery powering the station until the battery is depleted, thereby disabling the station. It is noted that such an attack is effective in draining the battery even if the station does not participate in active communications with the attacker after waking up the RCM.

The wake-up receiver operates with low power consumption. Therefore, the wake-up receiver is likely lacking in computing power necessary for executing advanced security algorithms for verifying if a received wake-up signal is fake or not. Even if the wake-up signal includes a message integrity code (MIC), the MIC will likely be short due to a lack of computing power in the wake-up receiver, as well as due to a desire for keeping the overall wake-up signal short in order to reduce overhead (i.e., channel occupancy) and power consumption (which is a primary concern of the receiving station). The lack of advanced security algorithms and short MIC length may enable an attacker to falsify the entire wake-up signal including the MIC by using brute-force techniques, for example.

The MIC is a value generated by a hash function with a data and a secret key as the inputs to the hash function and is used by a recipient who also has the secret key to check the authenticity and integrity of the data in order to determine if the data has been altered or falsified. Generally speaking, when the MIC is sufficiently long and is generated with a strong hash function (such as a cryptographic hash function), if the input data is changed or falsified (e.g., by an attacker), a new MIC value cannot be correctly computed by the attacker without having access to the secret key used by the recipient to check the authenticity and integrity of the data. However, when the MIC is not long enough or when the hash function used is a weak one (such as a CRC function), an attacker may be able to correctly guess the MIC value (by random chance) by using brute-force techniques. A detailed discussion of the MIC and its use in integrity checking is provided below.

Under these circumstances, an attacker may not know the correct wake-up signal of a station initially. The attacker may use a brute-force approach and sequentially send all possible wake-up signals. If, by chance, the attacker happens to send the correct wake-up signal, the station responds by transmitting a frame (shown as event 534 in FIG. 5, for example) after the RCM is woken up. Thus, the attacker can use the fact that the station transmits a response using the RCM as a check to determine if a falsified wake-up signal happens to be correct, i.e., the faked wake-up signal happens to have the correct wake-up address of the station, and the correct MIC (if the MIC is also included in the wake-up signal). After the attacker discovers the correct wake-up signal, the attacker can repeatedly send the correct wake-up signal to drain the battery of the station. Therefore, the operation flow illustrated in FIG. 5 is disadvantageous, not only because of the additional latency and power consumption incurred, but also because of the vulnerability to attacks on the battery of the station.

To overcome these disadvantages, according to an example embodiment, the AP transmits a first frame using an enhanced RCM (such as RCM 307 of FIG. 3) associated with the RCM (such as RCM 312 of FIG. 3) of the station woken up by the wake-up signal within a specified amount of time after transmitting the wake-up signal, without having to wait for a response from the station before transmitting the first frame, wherein the first frame allows an intended recipient to authenticate the source of the first frame received, thereby implicitly authenticating the source of the wake-up signal received prior to the first frame. Instead of having to wait for a response (to the wake-up signal) from the station, the AP has to only wait the specified amount of time for the station to turn on its RCM before commencing operations associated with the transmission of the first frame. As an illustrative example, the specified amount of time is set in accordance with the latency that the station requires to wake up the RCM and is referred to herein as a station RCM wake up latency or a station RCM wake up latency period. In a situation where the station has multiple RCMs, the specified amount of time is set in accordance with the latency required to wake up the RCM that takes the longest to turn on. The station may still have to perform CCA after waking up the RCM. However, the CCA duration is shortened with the reception of the first frame from the AP, because the station is able to use the duration field in the medium access control header of the first frame to set its NAV, thus satisfying one of the two wake-up requirements described previously.

At the AP, after the station RCM wake up latency expires (i.e., after the RCM of the station is expected to have fully waken up), the AP (within a time limit) transmits a first frame to at least the station (the first frame may be addressed to the station or a group that includes the station, or is broadcasted), wherein the first frame includes an identifier (such as a medium access control address) of the station or a broadcast identifier (such as a broadcast medium access control address) in a receiver address field of the first frame. The first frame also includes a MIC. The MIC in the first frame is used by the station to verify the authenticity and integrity of the first frame, and thereby implicitly, the authenticity of the wake-up signal received prior to the first frame. Because the MIC in the first frame is to be received and processed by the fully featured RCM of the station, this MIC can be made sufficiently long and a strong cryptographic hash function can be used to generate the MIC so that it is virtually impossible for an attacker to falsify the MIC by using a brute-force approach.

The AP may further set the acknowledgement (ACK) policy in the first frame to "no ACK" (e.g., when the first frame is a management frame) or "Block ACK" (e.g., when the first frame is a data frame and the data frame needs to be acknowledged). The ACK policy of a frame is indicated by bits B5 and B6 in the quality of service (QoS) control field in the medium access control header of the frame. According to IEEE 802.11 standards, a "normal ACK" policy in a frame indicates that an intended recipient should send an ACK control frame after one short interframe space (SIFS) interval after receiving the frame; a "no ACK" policy in a frame indicates that an intended recipient should not send an ACK control frame after receiving the frame; and a "Block ACK" policy in a frame indicates that an intended recipient should cache the result of the reception of the frame, wait to receive a Block ACK Request frame from the same transmitting station, then respond to the Block ACK Request frame with a Block ACK frame including the cached result. According to the example embodiments presented herein, if the ACK policy in the first frame received is "normal ACK", the station shall not send an ACK frame back or shall at least verify the first frame before sending the ACK frame. If the ACK policy in the received first frame is set to "normal ACK" and if the standardized protocol prohibits that, the station may consider the first frame is faked and is sent to trick the station into revealing itself. Then, the station will not transmit an ACK frame to acknowledge the first frame so that an attacker cannot use a faked first frame to trigger the station to transmit without a thorough security verification being performed on the received frame.

At the station, after receiving the wake-up signal, the station wakes up the RCM (which may be one RCM out of a plurality of RCMs) to receive and process the first frame. The station may look for a specific type of frame as a candidate of the first frame for further processing and may ignore other types of frame even if received without error. For example, during a normal operation for data exchanges, the station would ordinarily react to a request-to-send (RTS) frame that is addressed to the station by responding with a clear-to-send (CTS) frame. But when the station is woken up by a wake-up signal, the station wouldn't react to an RTS frame before the station receives the first frame that can verify the authenticity of the wake-up signal. In addition, the station may look for a frame that is encryption and integrity protected or is at least integrity protected as a candidate of the first frame for further processing and ignore frames that are not protected. For example, if a frame is an encryption and integrity protected frame, a Protected Frame bit (i.e., Bit14) in a frame control field (such as frame control field 705 in FIG. 7A) of the frame is set; otherwise, the Protected Frame bit is not set. As another example, if the first frame is only integrity protected but not encryption protected, the frame body of the first frame includes a Management MIC element (MME). The MME includes a MIC that is computed using values of fields in the first frame that need to be verified and a secret key.

It should be noted that the integrity protection provided by a MIC cannot be provided through the use of a CRC function. A difference between a MIC and a CRC is that a CRC is generally only suitable for detecting transmission errors, not for detecting alteration or falsification. The attacker can falsify both the CRC value and the content that the CRC protects, and still be able to pass the CRC check easily. Additionally, the CRC function is not a one-way function, meaning that it is reversible. Hence, if a secret key is included in the CRC calculation, there is a risk of exposing the secret key. On the other hand, the MIC value is computed with a secret key and a cryptographic hash function, which is a one-way function and will not expose the secret key. The integrity protection provided by the MIC is more focused on authenticating the source of the first frame and the integrity of the content of the first frame (e.g., against alteration). So, the station may look for a frame of which the Protected Frame bit is set or which includes an MME in the frame body as a candidate of the first frame, and ignore frames of which the Protected Frame bit isn't set and which doesn't include an MME in the frame body. Furthermore, as described previously, the station may look for a frame with an ACK policy (as indicated by bits B5 and B6 in the quality of service (QoS) control field in the medium access control header of the frame) of "no ACK" or "Block ACK" as a candidate of the first frame, and ignore frames with other ACK policy values. Overall, by ignoring frames that don't meet certain criteria (such as those described above) as the first frame, the station can avoid being tricked by an attacker, who had also faked the wake-up signal earlier, into revealing itself.

After a received frame passes the criteria as a candidate of the first frame as described above, the station will further verify an authenticity of the first frame, e.g., by verifying if a MIC value computed by the station using values contained in the received first frame matches a MIC value included in the received first frame. If the verification of the MIC of the first frame is successful, the station considers that the first frame (as well as the wake-up signal received prior to the first frame) is authentic and proceeds with transmitting a second frame to the AP, e.g., to indicate that the RCM has been woken up. Then, the AP and the station may exchange data.

If the verification of the MIC of the first frame is unsuccessful, the station considers that the first frame and the previously received wake-up signal are fakes. Additionally, if the station does not receive the first frame within a pre-defined time period after waking up its RCM and while the channel is determined to be idle (as detected using CCA, for example), the station considers the previously received wake-up signal to be a fake or that the detection of the previously received wake-up signal to be a result of a false detection. In the situations wherein the station considers the wake-up signal (and possibly the first frame) to be faked or the result of a false detection, the station may discard the wake-up signal and place the RCM back into sleep mode without responding to the AP. In general, the lack of response from the station makes it more difficult for the attacker (which is carrying out a brute-force attack on the wake-up receiver of the station) to determine which faked wake-up signal is the correct wake-up signal (i.e., the wake-up signal that includes the MIC that can be successfully verified).

In the event of an unsuccessful wake-up as described above, before the station places its RCM back into sleep mode, the station may use a memory, e.g., a non-volatile memory that is associated with its RCM, to record the event(s) (or information related thereto) in a form of a counter value or a data log. As an example, a counter may record a total number of faked wake-up signals, falsely detected wake-up signals, or both since a previous report. As another example, a data log may record all faked wake-up signals, all false detections of a wake-up signal, or both in a chronological order and with a timestamp for each recorded event. The station may report the counter(s) or the data log(s) at the next time when the station communicates with the AP using its RCM. The counter(s) and data log(s) may assist the AP in diagnosing a status of the station and/or the communication system, such as if the station has been attacked, if the system is facing a security threat, etc. The AP may use the diagnosis to change a configuration or a mode of operation.

Figure 6:
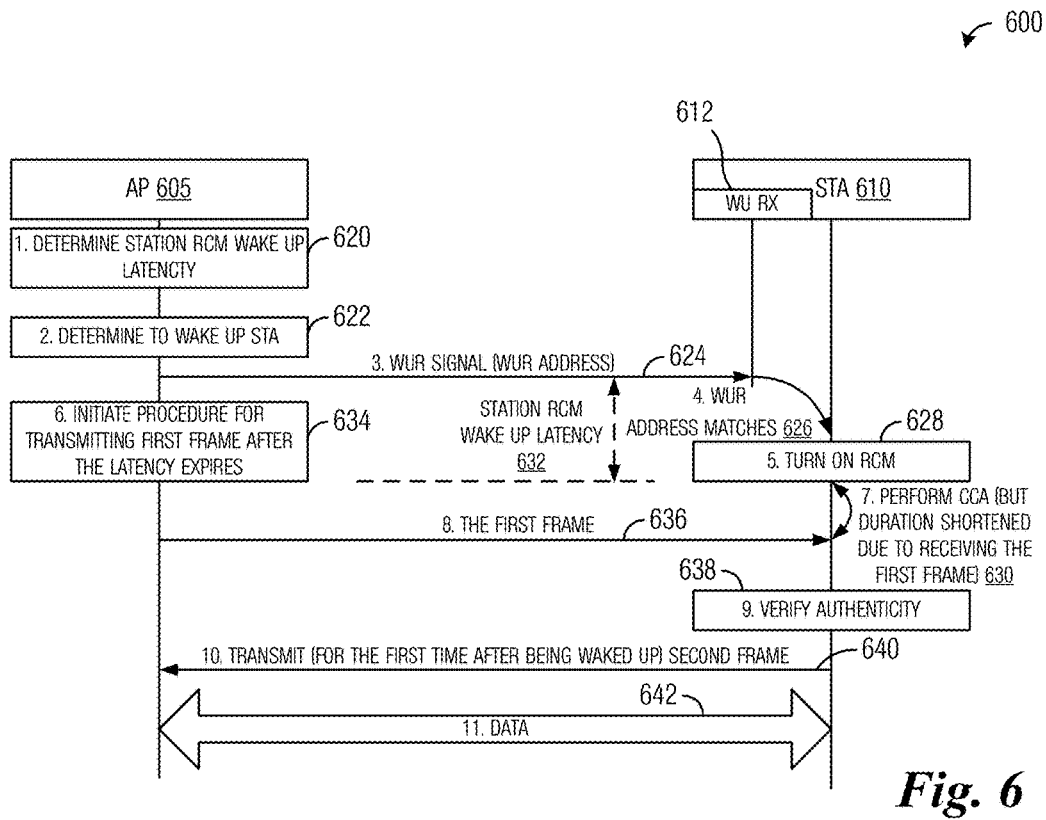
FIG. 6 illustrates a diagram of operations performed and messages exchanged by devices participating in communications with one of the devices in a sleep or reduced power state according to example embodiments described herein.

FIG. 6 illustrates a diagram 600 of operations performed and messages exchanged by devices participating in communications with one of the devices in a sleep or reduced power state. Diagram 600 illustrates operations performed and messages exchanged by an AP 605 and a station 610. Station 610 includes a wake-up receiver 612.

AP 605 determines the station RCM wake up latency of station 610 (block 620). AP 605 may obtain the station RCM wake up latency from station 610 through signaling exchanges while the station's RCM is active (e.g., as a part of a capability information exchange during an association procedure between AP 605 and station 610), retrieve the station RCM wake up latency from a memory (local or remote), or retrieve the station RCM wake up latency from a network entity that manages the station RCM wake up latencies for different stations. At a later time, station 610 places its RCM into a sleep (or reduced power) mode and switches on its wake-up receiver 612. AP 605 determines to wake up station 610 (block 622). AP 605 generates a wake-up signal including a wake-up address of station 610. The wake-up address may be included in a plaintext form, a ciphered form, or a code-spread form. AP 605 transmits the wake-up signal (event 624). The wake-up signal is received by wake-up receiver 612 of station 610. Wake-up receiver 612 may process (such as parse, decipher, and/or de-spread) the wake-up signal in order to obtain the wake-up address contained in the wake-up signal. Wake-up receiver 612 determines that the wake-up address included in the wake-up signal matches the wake-up address of station 610 (event 626) and asserts a control signal to wake up a RCM of station 610. The RCM of station 610 is turned on (block 628). Station 610 starts to perform CCA (event 630). An interval 632 corresponds to the station RCM wake up latency, which may be longer than the actual amount of time required to turn on the RCM of station 610.

AP 605 initiates a procedure for transmitting the first frame (block 634). The procedure for transmitting the first frame includes waiting a DIFS period plus a random backoff time, for example. The procedure for transmitting the first frame may be initiated either after expiration of the station RCM wake up latency or a short time (as long as it is shorter than the total waiting time of a DIFS plus the random backoff time) before the expiration of the station RCM wake up latency, so that the actual transmission of the first frame occurs after the expiration of the station RCM wake up latency. AP 605 transmits the first frame (event 636).

Station 610 receives the first frame using the RCM and verifies the authenticity (of the source of the first frame) and integrity (e.g., against alterations) of the first frame (block 638). As an illustrative example, station 610 uses a secret key known by station 610 and AP 605 to verify the authenticity and integrity of the first frame. It is noted that although station 610 performs CCA after waking up the RCM, the CCA duration is shortened by the reception of the first frame. For discussion purposes, the authenticity and integrity of the first frame is verified and station 610 transmits a second frame to AP 605 (event 640). AP 605 and station 610 exchange data (event 642).

According to an example embodiment, the first frame is a management frame, such as an action frame, with encryption and integrity protection, e.g., based on counter mode (CTR) with Cipher-Block Chaining (CBC) Message Authentication Code (MAC) Protocol (CCMP). A data frame, with similar encryption and integrity protection, may alternatively be used as the first frame. However, without knowing for sure if the station is present and woken up, it may be wasteful (in terms of resources) for the AP to transmit a data frame to the station. A short data frame may be used as a first frame as a compromise. If the AP is unable to transmit the first frame within the time limit after transmitting the wake-up signal, e.g., due to contention for a busy channel or the AP has a pending transmission with higher priority than the first frame, the AP expects the station to return to sleep mode. In this situation, the AP may consider that the attempt of waking up the station has failed and decide to try again, e.g., immediately or at a later time (such as when the channel is not busy, for example).

Figure 7A:
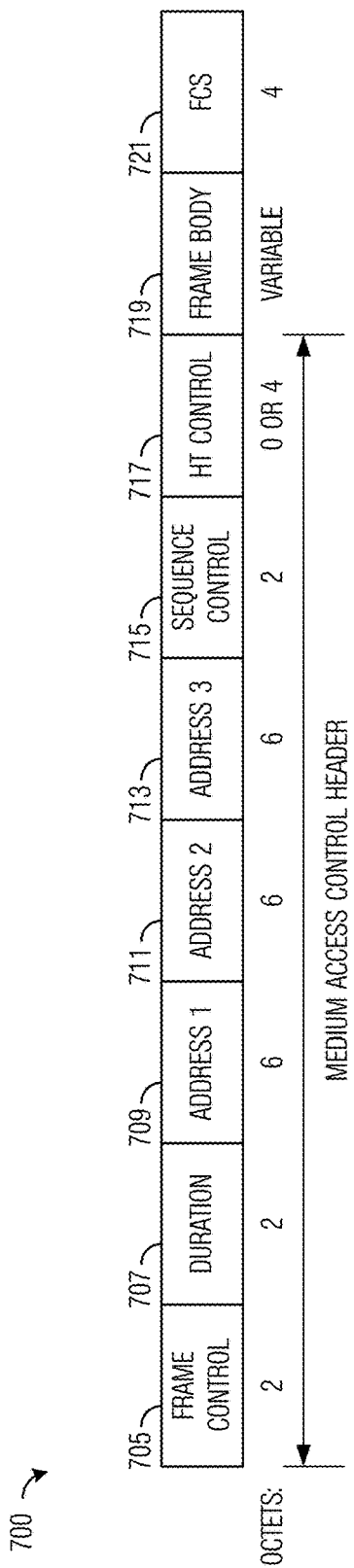
FIG. 7A illustrates a generic management frame.

FIG. 7A illustrates a generic management frame 700. Management frame 700 is an example of a first frame in a plaintext form, which is prior to application of the encryption and integrity protection as well as after the encrypted first frame has been received and deciphered. Management frame 700 includes a frame control field 705, a duration field 707, an address 1 field 709, an address 2 field 711, an address 3 field 713, a sequence control field 715, a high-throughput (HT) control field 717, a frame body 719, and a frame check sequence (FCS) field 721. Fields 705-717 make up a medium access control header of the first frame. Frame body field 719 is commonly referred to as a medium access control protocol data unit (MPDU) data. If the first frame is a protected action frame, a frame type and frame subtype subfields within frame control field 705 together indicate so and frame body field 719 (prior to asserting protection on it, such as inserting a CCMP header before it, applying an encryption to it, and inserting an encrypted MIC field after it) includes an action field.

Figure 7B:
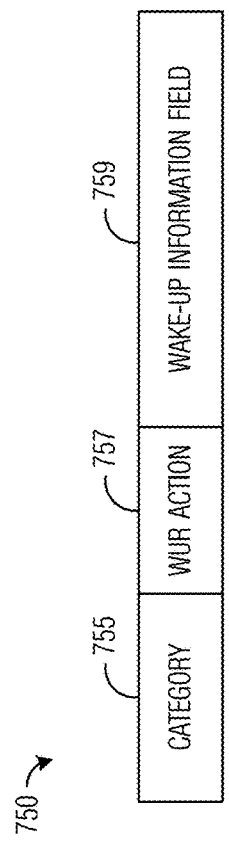
FIG. 7B illustrates an example format of an action field according to example embodiments described herein.

FIG. 7B illustrates an example format of an action field 750. Action field 750 includes a category field 755 that indicates that an action contained in action field 750 is a wake-up radio action, a WUR action field 757 that indicates the action type of the action is to verify an authenticity, e.g., explicitly, of the current frame (such as the first frame) and implicitly, of the wake-up signal. Action field 750 may also include a wake-up information field 759. Wake-up information field 759 may be present to indicate a reason or a parameter (such as an identifier of the RCM to be woken up) for the wake-up event to assist the station in responding. Wake-up information field 759 may be optional.

According to an example embodiment, the authenticity and integrity protection on the first frame is provided by CCMP in IEEE 802.11 technical standards. CCMP is based on CTR with CBC (CCM) of the Advanced Encryption Standard (AES) encryption algorithm. CCM combines CTR for data confidentiality and CBC-MAC for authentication and integrity. CCM protects the integrity of both the MPDU data field and selected fields of the medium access control header (such as frame control field 705 and address fields 709-713) so that these fields can't be altered or falsified). The AES algorithm is defined in Federal Information Processing Standard Publication (FIPS PUB) #197 and CCM is defined in Internet Engineering Task Force (IETF) Request for Comments (RFC) #3610. CCMP-128 processing expands the original MPDU size by 16 octets, with 8 octets for the CCMP header field and 8 octets for the MIC field. CCMP-256 processing expands the original MPDU size by 24 octets, 8 octets for the CCMP header field and 16 octets for the MIC field. As discussed previously, the MIC field in the first frame is used to verify that the first frame is authentic and hasn't been altered. The value in the MIC field is computed as an output of a cryptographic hash function with a cryptographic key and the values of various fields in the first frame, such as frame control field 705, address fields 709-713, and frame body field 719 (before applying encryption at the transmitter station side, and after deciphering at the receiving station side), as the inputs to the cryptographic hash function. The cryptographic key is shared only between the transmitting station and the intended receiving station. If an attacker tries to fake the first frame by altering or falsifying one or more values of these various fields, unless the attacker also possesses the cryptographic key, the attacker won't be able to compute the MIC value that can successfully pass the authentication and integrity verification performed by the intended receiving station. That leaves the attacker no choice but to guess the correct MIC value by brute-force. However, the MIC field used in CCMP is either 8 or 16 octets, which is much longer (thus stronger in a security sense) than a MIC field that one can practically include in a wake-up signal (as discussed earlier), making it difficult for the attacker to falsify the MIC value in a faked first frame correctly by brute-force. CCMP also includes mechanisms to prevent falsification through replay, which is described below. Therefore, if the MIC in the received first frame is authenticated, the probability is exceedingly high that the first frame and the wake-up signal are authentic.

Figure 8:
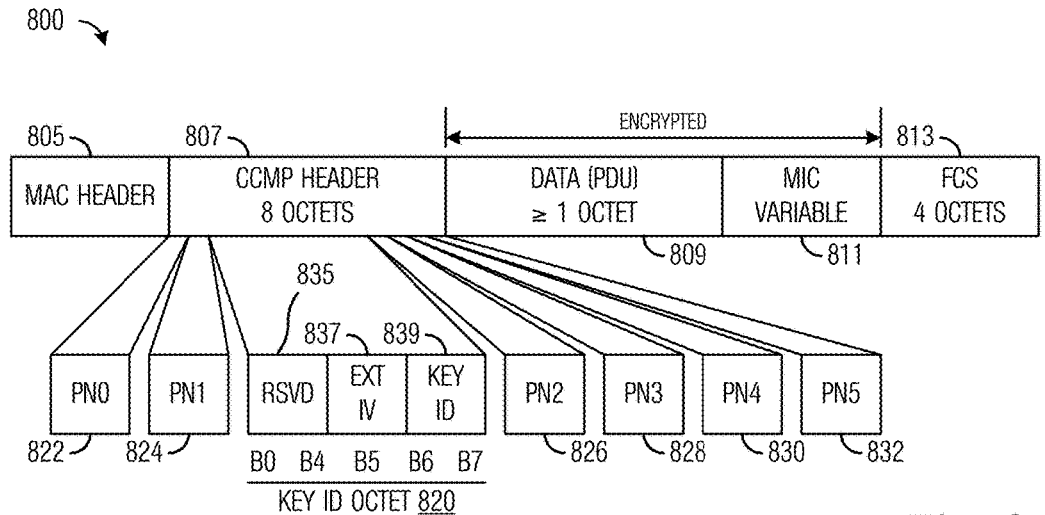
FIG. 8 illustrates an example MPDU with encryption and integrity protection.

FIG. 8 illustrates an example MPDU 800. MPDU 800 may be an example of how a plaintext frame (such as management frame 700) may be encryption and integrity protected with CCMP. MPDU 800 includes a medium access control header 805, which may be copied from the medium access control header (such as Fields 705-717) of the plaintext frame (such as management frame 700) that is being encryption and integrity protected, a CCMP header 807, data field 809 (which may be an encrypted version of frame body 719), a MIC field 811, and a FCS 813. CCMP header 807 is 8 octets long and includes a key identifier (ID) octet 820 and six pseudo-random number (PN) octets 822-832. The six PN octets 822-832 are incremented in steps of 1 for each MPDU and are used in computing the MIC value so as to prevent replay attacks. The decryption processing (which is performed by the intended recipient) prevents replay of MPDUs by validating that the PN in the MPDU is greater than a replay counter maintained for the session, for example. Key ID octet 820 includes a reserved field 835, and an Ext IV bit 837 that is set to "1" to indicate that the MPDU header is extended by 8 octets by the CCMP header instead of the 4 octets as by a wired equivalence protocol (WEP) header. Key ID octet 820 also includes a key id field 839. The key id field 839 is set to value "2" when CCMP is used.

The transmitting station (such as AP 605) constructs additional authentication data (AAD) by using various fields (such as frame control field 705 and address fields 709-713) in the medium access control header 805. Then, the transmitting station uses the AAD, a nonce value generated in accordance with the PN octets 822-832, a frame body of the plaintext frame (such as frame body 719), and a cryptographic key to generate the encrypted data and the encrypted MIC and include them in data field 809 and MIC field 811, respectively. The MIC is a value generated by a cryptographic hash function with values of the various fields in the first frame and the cryptographic key. The MIC is used by a target receiving station (such as station 610) for verifying the authenticity and integrity of the MPDU plaintext data in the frame body, after deciphering. Without having the knowledge of the cryptographic key, which is shared between the transmitting station and the target receiving station, an attacker, who is the third party, can't falsify a data, and with it, generate a MIC that can pass the verification performed by the receiving station.

The target receiving station (such as station 610) performs a CCM recipient processing. CCM recipient processing uses a cryptographic key (the same key used by the transmitting station), AAD constructed from the received medium access control header 805, the PN octets 822-832, MIC 811, and MPDU cipher text data (from data 809) to recover MPDU plaintext data as well as to check the integrity of the AAD and the MPDU plaintext data using MIC 811. The checking of the MIC is performed by matching MIC 811 (after deciphering) with a MIC generated by the recipient in accordance with the cryptographic key and the values of the various field in the received first frame. The MPDU plaintext is returned by the CCM recipient processing and passed on for additional processing only if the MIC check is successful.

According to another example embodiment, the authenticity and integrity protection on the first frame is provided by broadcast/multicast integrity protocol (BIP) as defined in IEEE 802.11 technical standards. The BIP provides integrity and replay protection for group addressed robust Management frames. A key difference between BIP and CCMP is that the BIP doesn't protect the confidentiality of the MPDU data in the frame body, i.e., the MPDU data is not encrypted. In this situation, the frame format of the first frame is very much as illustrated in FIG. 7A, except that the frame body (such as frame body 719) not only includes an action field (such as action field 750), but also includes an MME. The MME includes a MIC field containing a MIC value, a Key ID field identifying the integrity group temporal key (IGTK) used for computing the MIC value, an IGTK packet number (IPN) field containing a 6 octet sequence number, which is used in computing the MIC value so as to detect a replay, similar to the PN octets used in the CCMP as described before. The detailed BIP transmission processing and reception processing are defined in the IEEE Standard 802.11-2012.

In addition to example embodiments of using CCMP or BIP as described above, verification of the authenticity and integrity of the first frame can be provided by using other security protocols and algorithms as long as the first frame includes a MIC value that is generated with values of the first frame (including a sequence number for against replay), a secret key shared between the AP and the station, and a cryptographic hash function.

According to one example embodiment, the second frame is an 802.11 control frame, such as a power save—poll (PS-Poll) frame, indicating that the RCM of the station (such as RCM 612 of station 610) is woken up, and inviting the counterpart to start to send data. According to 802.11 standards, a control frame, including the frame check sum (FCS) field of the control frame, is not encrypted. The FCS value is used only for checking transmission errors, but can't be used to verify the authenticity of the content of the frame, because the FCS value can itself be easily falsified.

According to another example embodiment, the second frame is also a management frame (such as management frame 700 in plaintext form and MPDU 800 in encrypted form) with encryption and integrity protection in accordance with CCMP or with integrity protection in accordance with BIP. Therefore, the second frame also includes a MIC, in order to allow the AP to verify the authenticity of the source (i.e., the station) as well as the integrity of the second frame, thus preventing an attacker from impersonating the station.

In this case, station 610 is the transmitting station of the second frame and AP 605 is the receiving station of the second frame. AP 605 may perform the CCM recipient processing or BIP recipient processing to check the integrity of the second frame, more specifically, to check if the MIC received in the second frame matches with a MIC reconstructed in accordance with values of various fields in the second frame and a cryptographic key shared between AP 605 and station 610. The AP may start sending data to the station only if the AP can successfully verify the authenticity and the integrity of the second frame. A difference between a second frame and a first frame may be that the action field (such as action 750) in the second frame may include a different value in the WUR action field (such as WUR action field 757) to indicate that the action type of the action contained in the second frame is to indicate that the RCM of the station is woken up and to invite the counterpart to start to send data (if the counterpart can trust the source of the second frame).

FIG. 9 illustrates a flow diagram of example operations 900 occurring in an AP waking up and communicating with a station that has placed its RCM into a sleep or reduced power state. Operations 900 may be indicative of operations occurring in an AP as the AP wakes up and communicates with a station that has placed its RCM into a sleep mode.

Operations 900 begin with the AP determining the station RCM wake up latency (block 905). The AP may have obtained the station RCM wake up latency from the station through signaling exchanges prior to the station placing its RCM into the sleep mode (e.g., as a part of a capability information exchange during an association procedure between AP 605 and station 610), retrieve the station RCM wake up latency from a memory (local or remote), or retrieve the station RCM wake up latency from a network entity that manages the station RCM wake up latencies for different stations. At some time after the station has placed its RCM into the sleep mode and has switched on its wake-up receiver, the AP determines to wake up the station. The AP generates and transmits the wake-up signal (block 910). The AP generates a first frame (block 920). The AP transmits the first frame after the station RCM wake up latency, which begins after the AP finishes transmitting the wake-up signal, has expired (block 925). The first frame is transmitted on a radio access technology (RAT) and a frequency band associated with the RCM of the station. The AP receives a second frame from the station (block 930). The second frame may be an indication of activeness and/or a response from the station. The AP and the station exchange data (block 935). The AP may verify the authenticity and integrity of the second frame (by verifying if the MIC checks) before commencing the data exchange with the station.

FIG. 10 illustrates a flow diagram of example operations 1000 occurring in a station that is woken up and communicates with an AP. Operations 1000 may be indicative of operations occurring in a station as the station is woken up and communicates with an AP. The station has its RCM(s) in a sleep mode with its wake-up receiver active.

Operations 1000 begin with the RCM(s) of the station in a sleep mode and the wake-up receiver of the station active. The wake-up receiver of the station receives a wake-up signal (block 1005). The wake-up receiver processes the wake-up signal and if a wake-up address in the wake-up signal matches a wake-up address of the station, the wake-up receiver wakes up a RCM of the station (block 1010). The wake-up receiver may wake up the station by asserting a value on a control signal. The station may perform a check to determine if a first frame is received within a specified time threshold (block 1020). The station may attempt to receive the first frame with the RCM just woken up. The station may discard any received frames that don't meet pre-specified criteria as the first frame. The specified time threshold provides a limit on how long the station waits after receiving the wake-up signal before giving up on receiving the first frame. The specified time threshold may be specified by a technical standard, an operator of the communications system, or agreed upon by the station and the AP. If the first frame is received within the specified time threshold, the station performs a check to determine if the MIC of the first frame is verified successfully (block 1025). If the MIC is verified successfully, the station determines that the first frame and the wake-up signal are authentic and transmits a second frame (block 1030). The second frame provides an indication to the AP that the RCM of the station has been woken up. The second frame may be integrity protected as well, to allow the AP to verify the authenticity of the source of the second frame (i.e., the station) as well as the integrity of the second frame (e.g., against alteration), thus preventing an attacker from impersonating the station. The station and the AP exchange data (block 1035). If the first frame wasn't received within the specified threshold, the station discards the wake-up signal and places the RCM back to sleep mode without transmitting the second frame or any other frame (block 1040). Similarly, if the MIC did not verify successfully (block 1025), the station discards the wake-up signal and places the RCM back to sleep mode without transmitting the second frame or any other frame. The station may use a memory associated with its RCM to record the unsuccessful wake-up event before placing its RCM (and the memory) back into sleep mode. The station may report all recorded unsuccessful wake-up events to the AP at a later time when the station wakes up its RCM and communicates with the AP, in order to assist the AP in diagnosis of a network condition and in responding to any abnormality.

By placing the function of verifying the authenticity of a wake-up signal in a first frame (which is transmitted after the wake-up signal and is received and processed by the RCM of the station after being woken up) instead of in the wake-up signal itself (which is received and processed by the wake-up receiver), the wake-up receiver is dramatically simplified, resulting in low cost in implementing the wake-up receiver and low power consumption in operating the wake-up receiver. The RCM used for verifying the authenticity of the first frame are compliant with the existing communications standard, which already supports the security algorithms used for verifying the authenticity of the first frame. Therefore, no additional complexity is added to the RCM. By moving the information necessary for verifying the authenticity of the wake-up signal, which primarily includes the MIC value and the sequence number for countering replay, from the wake-up signal to the first frame, the signaling overhead representing such information can be carried using advanced transmission scheme such as orthogonal frequency division multiplexing (OFDM) and higher modulation and coding (MCS) levels, instead of using the On-Off-Keying (OOK) scheme that is typically used for transmitting the wake-up signal, thereby occupying less channel time. In summary, the techniques disclosed herein help to make the wake-up radio a simple and still security-wise robust auxiliary feature to the regular RCMs that are used in a variety of wireless communications devices where low power consumption is described.

According to an example embodiment, the AP and the station negotiates and configures if the station is required to receive a first frame and to verify the authenticity and integrity of the first frame before the station transmits, for the first time after being woken up, a second frame (such as an indication of having woken up) to the AP. As an illustrative example, when the AP determines that it is in a safe environment where no malicious attack on a wake-up receiver has been reported or detected, the AP may indicate to the station that the station is allowed, after waking up a RCM with the wake-up receiver, to transmit without the need for receiving a first frame or verifying a received first frame, as long as the station satisfies other transmission requirements (such as CCA requirements as specified by the technical standards) previously discussed. On the other hand, if an attack (or an unsuccessful wake-up event) is reported or detected or the number of such events exceeds a threshold, the AP may indicate to the station that the station is required to receive a first frame and to verify (the authenticity and integrity of) the received first frame prior to transmitting. In this situation, the AP is committed to transmitting the first frame within the specified time limit after transmitting the wake-up signal (or otherwise, the AP may consider the attempt of waking up the station has failed if the AP is not able to transmit the first frame within the specified time limit after transmitting the wake-up signal). In either situation (i.e., whether mandating or not mandating the first frame), the indication of the operating mode for the station may be transmitted by the AP in a configuration message received by a RCM of the station prior to the RCM being placed in the sleep mode and the use of the wake-up signal. Alternatively, the indication (such as an indication bit) may be included in the wake-up signal and is received by the wake-up receiver.

Although the discussion presented herein focuses on examples using IEEE 802.11 radio access technology, the inventive techniques described herein can also be applied to other contention-based radio access technologies, such as Bluetooth, Bluetooth Low Energy (BLE), IEEE 802.15.4/ZigBee, 3GPP LTE-Unlicensed (LTE-U), Licensed Assisted Access (LAA), MuLTEFire, etc.

Figure 11:
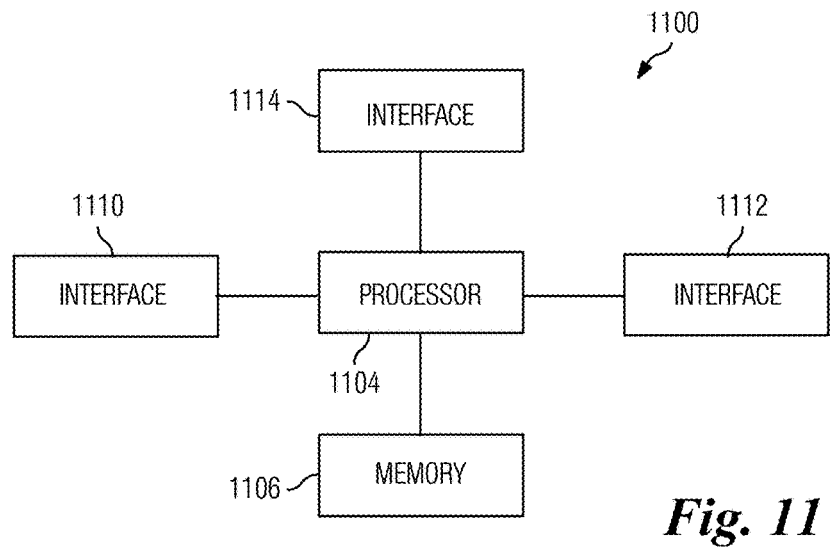
FIG. 11 illustrates a block diagram of an embodiment processing system for performing methods described herein.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications (such as a sensor) installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
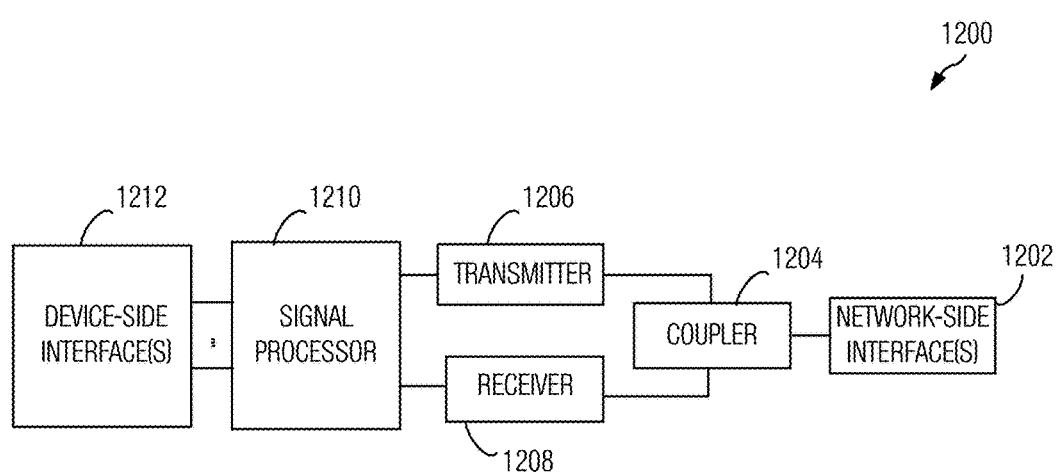
FIG. 12 illustrates a block diagram of a transceiver adapted to transmit and receive signaling over a telecommunications network according to example embodiments described herein.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 700 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. Besides the components adapted to receive the wide band communications signal, receiver 1208 may further include components adapted to receive a narrow-band wake-up signal. Alternatively, a wake-up receiver, which includes components adapted to receive the narrow-band wake-up signal, is implemented in parallel to receiver 1208 with a connection to a processor (such as signal processor 1210), which would allow the wake-up receiver to wake up the processor, which, in response, wakes up receiver 1208, transmitter 1206, and any other components that may have been placed into the sleep mode. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a waking up unit/module, a placing unit/module, an encryption unit/module, a decryption unit/module, a determining unit/module, and/or a generating unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for waking up a radio communications module (RCM) of a first station with a wake-up receiver, the method comprising:
    receiving, by the wake-up receiver of the first station, a wake-up signal from a second station, the wake-up signal including an identifier of the first station;
    waking up, by the first station, the RCM from a sleeping mode in accordance with the wake-up signal;
    receiving, by the RCM of the first station, a first frame including a second message integrity code (MIC) within a first time after waking up the RCM from the sleeping mode and successfully verifying, by the RCM of the first station, the second MIC to authenticate the second station; and
    transmitting, by the RCM of the first station in response to the successful verification of the second MIC, a second frame to the second station to indicate that the RCM of the first station is ready to receive data, the second frame being the first transmission by the RCM of the first station after waking up from the sleeping mode.

2. The method of claim 1, wherein successfully verifying the second MIC to authenticate the second station comprises determining that a first MIC generated in accordance with values in the first frame and a cryptographic key matches the second MIC in the first frame.

3. The method of claim 1, further comprising receiving, by the first station, an indicator conveying that the receiving of the first frame and the successful verification of the second MIC in the first frame are required before using the RCM for making a transmission.

4. The method of claim 3, wherein the indicator is received prior to the RCM of the first station being placed into the sleeping mode.

5. The method of claim 3, wherein the indicator is received in the wake-up signal.

6. The method of claim 1, further comprising transmitting, by the first station, a station RCM wake up latency to the second station, the second station being an access point (AP) serving the first station.

7. The method of claim 1, wherein the first frame is a protected management frame with integrity protection in accordance with one of counter mode (CTR) with Cipher-Block Chaining (CBC) Message Authentication Code (MAC) Protocol (CCMP) or broadcast/multicast integrity protocol (BIP) and compliant with IEEE 802.11 standards.

8. The method of claim 7, wherein the second frame is a protected management frame with integrity protection in accordance with one of CCMP or BIP and compliant with IEEE 802.11 standards.

9. The method of claim 1, further comprising, after transmitting the second frame:
    placing, by the first station, the RCM into the sleeping mode;
    receiving, by the first station, a second wake-up signal with the wake-up receiver, the second wake-up signal including the identifier of the station;
    second waking up, by the first station, the RCM from the sleeping mode; and
    in response to receiving a third frame including a third MIC that is not verified successfully, or in response to not receiving the third frame within a second time after the second waking up the RCM:
        discarding, by the first station, the second wake-up signal without using the RCM for making another transmission; and
        placing, by the first station, the RCM into the sleeping mode and the wake-up receiver into an active mode.

10. The method of claim 9, further comprising, in response to receiving the third frame including the third MIC that is not verified successfully, or in response to not receiving the third frame within the second time after the second waking up the RCM:
    recording, by the first station, an unsuccessful wake-up event; and
    reporting, by the first station, the unsuccessful wake-up event to the second station at a later time when the first station is communicating with the second station, the second station being an access point (AP) serving the first station.

11. The method of claim 1, wherein a radio frequency (RF) bandwidth of the wake-up receiver is narrower than an RF bandwidth of the RCM.

12. The method of claim 1, wherein successfully verifying the second MIC to authenticate the second station comprises verifying the second MIC to authenticate the second station as the source of the wake-up signal and the first frame.

13. A method for operating a first station configured to wake up a radio communications module (RCM) of a second station, the method comprising:
    transmitting, by the first station, a wake-up signal to a wake-up receiver of the second station, the wake-up signal for waking up the RCM from a sleeping mode;
    transmitting, by the first station to the RCM of the second station, information conveying that verifying a message integrity code (MIC) to authenticate the first station is required before the second station uses the RCM for making a transmission;
    transmitting, by the first station to the RCM of the second station, a first frame after a latency period expires, the first frame including the MIC generated by a cryptographic hash function with values in the first frame and a first cryptographic key, the latency period being based on a time needed for waking up the RCM of the second station from the sleeping mode; and receiving, by the first station, a second frame from the RCM of the second station indicating that the RCM of the second station has woken up and is ready to receive data, the second frame being the first transmission received from the RCM of the second station after transmitting the wake-up signal for waking up the RCM of the second station from the sleeping mode.

14. The method of claim 13, further comprising transmitting, by the first station, data to the RCM of second station in response to receiving the second frame, the data being the first transmission to the RCM of the second station after receiving the second frame indicating that the RCM of the second station has woken up and is ready to receive data.

15. The method of claim 14, wherein the second frame includes a second MIC, and wherein the method further comprises, before transmitting the data, determining, by the first station, that the second MIC matches a third MIC generated by a cryptographic hash function with values in the second frame and a second cryptographic key.

16. The method of claim 13, further comprising:
receiving, by the first station from the second station, a report of unsuccessful wake-up events; and
determining, by the first station, a first mode of operation in response to a number of the unsuccessful wake-up events reported exceeding a threshold, the first mode of operation requiring the second station to receive and verify the first frame successfully before the second station uses the RCM for making a transmission.

17. The method of claim 13, wherein the first station is an access point (AP) and the second station is served by the AP.

18. The method of claim 13, wherein a radio frequency (RF) signal bandwidth of the wake-up signal is narrower than an RF signal bandwidth of the first frame.

19. The method of claim 13, wherein the information is transmitted to the second station prior to the RCM of the second station being placed into a sleeping mode.

20. The method of claim 13, wherein the information is included in the wake-up signal.

21. The method of claim 13, further comprising:
determining, by the first station, a second mode of operation in response to not receiving a report of unsuccessful wake-up events, the second mode of operation not requiring the second station to receive and verify the first frame successfully before the second station uses the RCM for making the transmission.

22. The method of claim 13, further comprising:
receiving, by the first station from the second station, a report of unsuccessful wake-up events; and
determining, by the first station, a second mode of operation in response to a number of unsuccessful wake-up events reported not exceeding a threshold, the second mode of operation not requiring the second station to receive and verify the first frame successfully before the second station uses the RCM for making the transmission.

23. A first station comprising:
a wake-up receiver;
a radio communications module (RCM);
a non-transitory memory storage comprising instructions; and
a processor in communication with the wake-up receiver, the RCM, and the non-transitory memory storage, wherein the processor executes the instructions to:

receive, by the wake-up receiver of the first station, a wake-up signal from a second station, the wake-up signal including an identifier of the first station,
wake up the RCM of the first station from a sleeping mode in accordance with the wake-up signal,
receive, by the RCM of the first station, a first frame including a second message integrity code (MIC) within a first time after waking up the RCM from the sleeping mode and successfully verify, by the RCM of the first station, the second MIC to authenticate the second station; and
transmit, by the RCM of the first station in response to the successful verification of the second MIC, a second frame to the second station to indicate that the RCM of the first station is ready to receive data, the second frame being the first transmission by the RCM of the first station after waking up from the sleeping mode.

24. The first station of claim 23, wherein the processor executes the instructions to:
generate a first MIC in accordance with values in the first frame and a cryptographic key, and
compare the second MIC included in the first frame to the first MIC.

25. The first station of claim 23, wherein the processor executes the instructions to receive an indicator conveying that the receiving of the first frame and the successful verification of the second MIC in first frame are required before using the RCM for making a transmission.

26. The station of claim 25, wherein the processor executing the instructions to receive the indicator comprises the processor executing the instructions to receive the indicator prior to the RCM being placed into the sleeping mode.

27. The station of claim 25, wherein the processor executing the instructions to receive the indicator comprises the processor executing the instructions to receive the indicator in the wake-up signal.

28. The first station of claim 23, wherein the processor executes the instructions to transmit a station RCM wake up latency to an access point (AP) serving the station.

29. The first station of claim 23, wherein, after the processor executes the instructions to transmit the second frame, the processor executes the instructions to:
place the RCM into the sleeping mode;
receive a second wake-up signal with the wake-up receiver, the second wake-up signal including the identifier of the station;
second wake up the RCM from the sleeping mode; and
in response to receiving a third frame including a third MIC that is not verified successfully, or in response to not receiving the third frame within a second time after the second waking up the RCM:
discard the second wake-up signal without using the RCM for making another transmission; and
place the RCM into the sleeping mode and the wake-up receiver into an active mode.

30. The first station of claim 29, wherein, in response to receiving the third frame including the third MIC that is not verified successfully, or in response to not receiving the third frame within the second time after the second waking up the RCM, the processor executes the instructions to:
record an unsuccessful wake-up event, and
report the recorded unsuccessful wake-up event to the second station at a later time when the first station is communicating with the second station, the second station being an access point (AP) serving the first station.

31. The station of claim 23, wherein a radio frequency (RF) bandwidth of the wake-up receiver is narrower than an RF bandwidth of the RCM.

32. A first station comprising:
a non-transitory memory storage comprising instructions; and
a processor in communication with the non-transitory memory storage, wherein the processor executes the instructions to:
transmit a wake-up signal to a wake-up receiver of a second station, the wake-up signal for waking up a radio communications module (RCM) of the second station from a sleeping mode,
transmit, to the RCM of the second station, information conveying that verifying a message integrity code (MIC) to authenticate the first station is required before the second station uses the RCM of the second station for making a transmission,
transmit a first frame to the RCM of the second station after a latency period expires, wherein the first frame includes the MIC generated by a cryptographic hash function with values in the first frame and a first cryptographic key, and wherein the latency period is based on a time needed for waking up the RCM of the second station from the sleeping mode, and
receive a second frame from the RCM of the second station indicating that the RCM of the second station has woken up and is ready to receive data, the second frame being the first transmission received from the RCM of the second station after transmitting the wake-up signal for waking up the RCM of the second station from the sleeping mode.

33. The first station of claim 32, wherein the processor executes the instructions to:
receive a report of unsuccessful wake-up events from the second station,
determine a first mode of operation in response to a number of the unsuccessful wake-up events reported exceeding a threshold, the first mode of operation requiring the second station to receive and verify the first frame successfully before the second station uses the RCM for making the transmission.

34. The first station of claim 32, wherein a radio frequency (RF) signal bandwidth of the wake-up signal is narrower than an RF signal bandwidth of the first frame.

35. The first station of claim 32, wherein the processor executing the instructions to transmit the information to the second station comprises the processor executing the instructions to transmit the information to the second station prior to the RCM of the second station being placed into a sleeping mode.

36. The first station of claim 32, wherein the processor executing the instructions to transmit the information comprises the processor executing the instructions to transmit the information in the wake-up signal.

37. The first station of claim 32, wherein the processor executes the instructions to:
determine a second mode of operation in response to not receiving a report of unsuccessful wake-up events, the second mode of operation not requiring the second station to receive and verify the first frame successfully before the second station uses the RCM for making the transmission.

38. The first station of claim 32, wherein the processor executes the instructions to:
receive a report of unsuccessful wake-up events from the second station, and
determine a second mode of operation in response to a number of the unsuccessful wake-up events reported not exceeding a threshold, the second mode of operation not requiring the second station to receive and verify the first frame successfully before the second station uses the RCM for making the transmission.

* * * * *